United States Patent
Kunert

(10) Patent No.: US 6,177,926 B1
(45) Date of Patent: Jan. 23, 2001

(54) HAND-HELD COMPUTER HAVING INPUT SCREEN AND MEANS FOR PREVENTING INADVERTENT ACTUATION OF KEYS

(75) Inventor: Steven R. Kunert, Cedar Rapids, IA (US)

(73) Assignee: Intermec IP Corp., Woodland Hills, CA (US)

( * ) Notice: Under 35 U.S.C. 154(b), the term of this patent shall be extended for 0 days.

(21) Appl. No.: 08/955,899

(22) Filed: Oct. 22, 1997

Related U.S. Application Data

(60) Provisional application No. 60/029,088, filed on Oct. 22, 1996, and provisional application No. 60/032,426, filed on Dec. 5, 1996.

(51) Int. Cl.$^7$ ................................................ G09G 5/00
(52) U.S. Cl. ........................ 345/173; 345/156; 178/18.03
(58) Field of Search ..................... 345/156, 157, 345/168, 169, 173, 179; 361/681; 364/708.1; D14/100, 114, 115, 115.1, 117.9; 178/18.03

(56) References Cited

U.S. PATENT DOCUMENTS

| | | | |
|---|---|---|---|
| 4,129,746 | * 12/1978 | Lambden | 178/18 |
| 4,262,281 | * 4/1981 | Buckle et al. | 382/315 |
| 5,023,824 | 6/1991 | Chadima, Jr. et al. | 364/708 |
| 5,193,925 | * 3/1993 | Foulke | 400/715 |
| 5,231,380 | * 7/1993 | Logan | 345/156 |
| 5,331,136 | 7/1994 | Koenck et al. | 235/375 |
| 5,396,399 | * 3/1995 | Blair et al. | 361/681 |
| 5,457,480 | * 10/1995 | White | 345/163 |
| 5,528,523 | * 6/1996 | Yoshida | 708/141 |
| 5,566,098 | * 10/1996 | Lucente et al. | 364/708.1 |
| 5,646,649 | * 7/1997 | Iwata et al. | 345/173 |
| 5,745,591 | * 4/1998 | Feldman | 382/115 |
| 5,808,922 | * 9/1998 | Martinez et al. | 708/141 |
| 5,956,019 | * 9/1999 | Bang et al. | 345/173 |

* cited by examiner

*Primary Examiner*—Kent Chang
(74) *Attorney, Agent, or Firm*—Suiter & Associates, PC

(57) ABSTRACT

A hand-held computer terminal employing a touch screen for the input of handwritten data comprises a contoured surface disposed between a touch screen surface and input keys or buttons, thereby providing improved ergonomics aiding in the entry of handwritten data while preventing unintentional actuation of input keys or button during the entry of handwritten data.

5 Claims, 16 Drawing Sheets

HAND-HELD COMPUTER HAVING INPUT SCREEN AND MEANS FOR PREVENTING INADVERTENT ACTUATION OF KEYS

CROSS REFERENCE TO RELATED APPLICATIONS

This application claims priority under 35 U.S.C. § 119(e) based on U.S. provisional application Ser. No. 60/029,088, filed Oct. 22, 1996, and U.S. provisional application Ser. No. 60/032,426, filed Dec. 5, 1996, both of which are hereby incorporated by reference in their entireties.

TECHNICAL FIELD

The present invention relates generally to a hand-held computer terminal employing a touch screen for the input of handwritten data, and more particularly, to a hand-held computer terminal employing means for preventing unintentional actuation of input keys or buttons during the entry of handwritten data.

BACKGROUND OF THE INVENTION

Portable computers, such as hand-held data entry terminals, personal digital assistants, and the like are commonly used in a variety of applications. For example, such computers are commonly used by individuals for personal computing purposes, by sales persons, distributors, delivery persons, auditors, and the like, where it is advantageous to employ a portable computer terminal in a route or otherwise mobile setting. Such applications include sales, distribution, control and inventory of products delivered, and delivery or tracking of products, packages, etc. Portable or hand-held data terminals have proven useful in increasing the efficiency of such applications by automating the entry and electronic storage of order, sales, delivery, receipt, pricing, inventory control, and other information.

In many of such mobile personal computing or distribution and delivery situations, it is often desirable to input handwritten data using a touch screen or digitizing tablet and stylus rather than by using another input device, e.g., buttons, keypad, optical device, etc., for example, in those instances where it is easier, more convenient, or more efficient than using another input device. Particular instances where handwritten data may be desirable are, for example, when entering graphical textual information, selecting text, objects, or icons, etc. on a screen display, recording a signature, i.e., when signature is required for a delivery and/or for verification, etc.

Computers designed for hand-held use are desirably as small and lightweight as possible. However, the space limitations required for portability can result ergonomic disadvantages, such as a cramped area for the hand to rest while a user enters handwritten data. Another problem is the possibility of inadvertent actuation of keys by a user entering handwritten data via the touch screen. Thus, there is a need in the art for a hand-held computer which retains an efficient use of space while providing a means for preventing the unintended actuation of keys during the input of handwritten data and providing an ergonomic hand rest surface for entry of handwritten data.

SUMMARY OF THE INVENTION

The present invention provides a hand-held computer having handwritten data input means and means for preventing unintended actuation of input keys. Entry of handwritten data commonly employs a stylus and an input means such as a touch screen or digitizing tablet. Entering handwritten data using a stylus and touch screen or digitizing tablet is often more difficult than writing with pen and paper, in part because of low friction between the stylus and touch screen surface and also in part because of a lack of adequate hand support. Increasing the comfort and stability of the handwritten data entry process gives the advantage of increased accuracy or legibility of handwritten data. For example, character recognition is a software feature often found on hand-held units. The performance of character recognition programs can be improved if handwritten characters can be more consistently and more legibly entered. Also, potential problems with verification or authentication of an electronic signature can be minimized by ergonomically improving the handwritten data entry process, thereby improving legibility.

It would also be desirable to provide a hand-held computer wherein the keys are protected from actuation when the person entering the handwritten data is not the primary user, for example, in a mobile setting such as sales, delivery, etc., where an handwritten data such as an electronic signature is recorded. In such cases, it is advantageous to protect the keys from inadvertent actuation by providing a barrier between the hand and keys or by temporarily deactivating the keys.

In a first embodiment according to the present invention, the means for preventing unintended actuation of input keys comprises an ergonomically improved hand rest surface disposed adjacent to the handwritten data input means to facilitate the handwritten data entry process. The hand-rest surface serves not only to provide support for the hand during the entry of handwritten data, but also acts as a barrier to protect any keys, buttons, and the like, which are disposed on the surface of the computer from unintentional or accidental actuation by the user during a signature or other handwritten data entry process.

In a second embodiment of the present, the means for preventing inadvertent actuation of keys during the handwritten data entry process comprises a sleep button which deactivates some or all of the keys or buttons on the computer.

In a third embodiment of the present invention, the means for preventing unintended actuation of keys comprises a sensor beneath the handrest portion of the computer housing which deactivates some or all of the keys or buttons on the computer.

In a fourth embodiment of the present invention, the means for preventing unintended actuation of keys comprises means for deactivating some or all of the keys or buttons when the touch screen is in use.

Additionally, the hand-held computer according to the present invention is advantageously light in weight and is rugged enough for use in a sales route, delivery or distribution route, or otherwise mobile environment, protected against external contaminants, such as rain and dust, and protected against excessive shock due to dropping or rough handling.

BRIEF DESCRIPTION OF THE DRAWINGS

The detailed description of the invention may be best understood when read in reference to the accompanying drawings wherein.

DETAILED DESCRIPTION OF THE INVENTION

Figure 1:
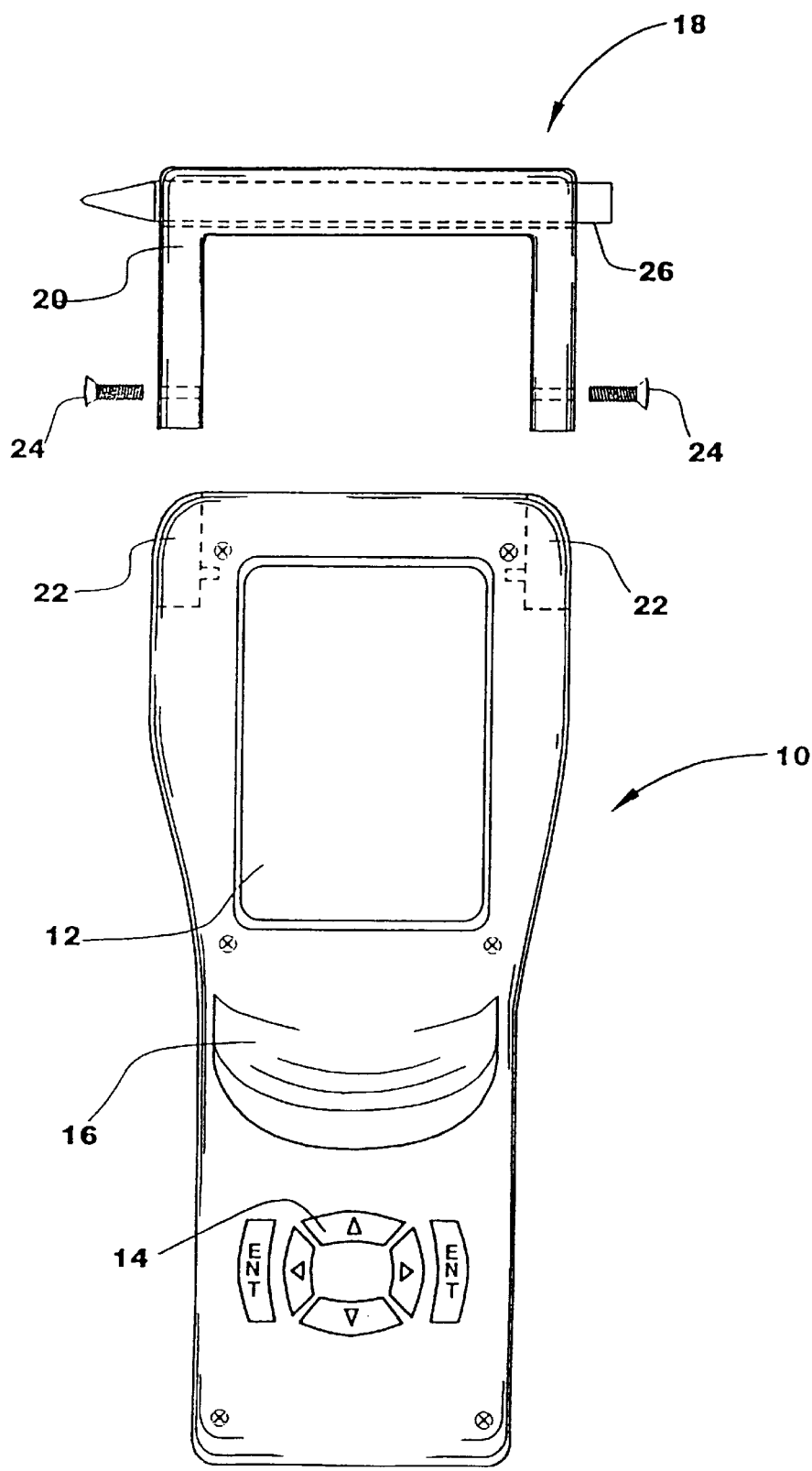
FIG. 1 shows a general pictorial representation of a particular embodiment of the computer according to the present invention.

1. Hand-Held Computer Having Contoured Hand Rest.

The first means for preventing inadvertent actuation of keys according to the present invention comprises a contoured hand rest surface located on the upper housing surface of the computer. The hand rest surface may be located on all sides of the touch screen, or on any one or more sides. For example, the hand rest surface may be located adjacent to one side the touch screen that is disposed away from or distant from any keys present on the computer housing. The hand rest should also locate the hand to a ergonomically favorable position for writing.

A portion of the contoured surface is advantageously elevated above the level of keys or buttons present on the surface of computer, allowing the contoured surface to serve as a physical barrier between the user's hand and the input keys or buttons of the computer. A particular advantage of the present invention can be seen in a delivery or sales route setting where the user, such as a delivery recipient or customer, etc., is likely to be an infrequent user of the data entry device and thus, is likely to be unfamiliar with the feel and/or button placement of such a handwritten data entry device. Another advantage of the present invention can be seen where a user is required to enter large quantities of handwritten data, or where the device will be used over an extended period of time.

The terms "keys" or "buttons" are not limited to any particular type or configuration, and may range from a single input key or button or a plurality of keys or buttons which serve to input data or to input a user's selection of an object on the screen such as icons, text, on screen dialog buttons, or other input features, such as mouse clicks, and the like. "Keys" and "buttons" also can include, for example, directional or arrow buttons which allow a user move locate a cursor on the screen or to scroll the screen display, etc., conventional input keys such as escape, enter, tab, backspace, delete, control, caps lock, and the like, or specially defined function keys, etc. Also included within the scope of the terms "keys" and "buttons" are the keys of alphabetical and/or numerical keypads or keyboards.

As used herein, the term "elevation" with respect to the upper housing surface, or a portion thereof, such as the touch screen area or keypad area of the upper housing surface, refers to the distance above or below the upper housing surface, i.e., in the "z" direction of an (x,y,z) coordinate system with longitudinal lines and latitudinal lines along the upper housing surface representing the "x" and "y" directions.

Although the hand rest surface according to the present invention is advantageously described herein with respect to a touch screen display, the hand rest surface may also advantageously be employed on hand-held computers which comprise a separate display screen and handwritten data input device, such as a signature pad or digitizing tablet and the like.

In an advantageous embodiment of the present invention, the hand-held computer includes a housing which has, among other features, a hand rest surface disposed between a touch screen input device mounted over a display, and having input keys or buttons disposed on the upper surface of the computer housing.

The hand rest surface can be an integrally molded part of the housing, or may alternatively may be detachable piece which may be fit over the computer for signature or capture of other handwritten input. Where the hand rest surface is an integrally molded part of the computer housing surface, the internal space can be utilized to house components of the computer, heat sink, molded protrusions, mounting bosses, and the like.

Where a detachable hand rest surface is employed, it is advantageously made from an inexpensive and lightweight material, and should be easy and inexpensive to replace. The hand rest may also be deformable, allowing the rest to resiliently conform to a user's hand. Examples of suitable include foams, including polystyrene, polyurethane, and the like, gels, and rubber. Alternatively, the hand rest may be rigidly constructed and may comprise a lightweight material encased in a rigid shell, such as a molded plastic shell.

Because of the desirability of small size in hand-held units, a detachable rest according to the present invention may rest directly over the keys and/or a portion of the input display. For example, the hand rest may comprise a sheath into which the computer may be inserted, or the hand rest may clip onto a side. The hand rest may cover only the keys or may additionally cover a portion of the input screen, leaving the necessary area of the screen available for entering handwritten data. For example, the hand rest could extend to cover a portion of the screen or the hand rest could have a port for signature and otherwise cover the entire screen. When the hand rest serves to locate the hand sufficiently far from input keys, it is not necessary that the buttons themselves be physically covered. The detachable hand rests according to the present invention may optionally be rotated, i.e, 90° or 180° for use by both right and left handed persons, and may advantageously be used in conjunction display rotation feature, for example, to bring a signature line on the screen to the most ergonomically favorable position on the display relative to the position of the hand rest. The detachable hand rest may comprise a flat or contoured surface which deformable or rigid. Where the detachable hand rest surface is mounted directly over keys, the bottom surface of the hand rest should be elevated above the level of the input keys, for example, by protrusions located on the bottom surface of the removable hand rest or on the upper surface of the computed housing, or alternatively, through the use of recessed keys. The bottom surface of the hand rest should also be sufficient sufficiently rigid to prevent actuation of the keys underneath during use. Other methods of removable attaching the hand rest to the computer housing include snap fit devices, mounting slots located on the computer housing, or swivel device allowing the hand rest to swivel from side to side or from front to back When the hand rest according to the present invention is removable from the computer housing, it may advantageously be attached to a strap which is attached to the computer housing In another embodiment of the present invention, the underside of the housing is contoured for comfortable gripping by the person entering handwritten data in one hand while handwritten data is entered via the touch screen by the other hand, e.g., via a lower surface or underside portion of the computer housing which is inwardly displaced, curvilinear, sloping, or otherwise forms a hand grip conforming portion. Advantageously, the base of the computer should also be sufficiently flat to provide a stability when handwritten data is entered while the unit is resting on a table.

In a particular embodiment of the present invention, the hand-held computer has a housing that is generally rectangular in shape. The central portion of the upper surface contains a hand rest surface disposed adjacent an input screen. In one embodiment, the hand rest surface is elevated and tapered along the length of the housing between the touch screen and keypad areas of the upper housing surface such that the end of the hand rest surface disposed near the touch screen surface is substantially level with the level of the display/touch screen and the end of the hand rest surface disposed near the key pad area is elevated above the level of the touch screen, with the touch screen and keys or buttons being substantially at the same elevation with respect to each other.

Alternatively, the hand rest surface is elevated and is tapered longitudinally such that the end of the hand rest surface disposed near the touch screen surface is substantially level with the level of the display/touch screen and the end of the hand rest surface disposed near the key pad area is elevated above the level of the touch screen, and with the touch screen and keys or buttons being substantially different elevations on the upper computer housing with respect to each other.

In yet another embodiment of the present invention, the hand rest surface, or a portion thereof, may extend to an elevation below the elevation of the touch screen area of the upper computer housing and/or the keypad area of the upper computer housing, and the touch screen and keypad areas may be at substantially the same or substantially different elevations with respect to each other.

The width of the hand rest surface may be of any width sufficient to provide a comfortable rest for the heel or side of the hand during entry of handwritten data. The width may advantageously be the entire latitudinal distance of the upper surface or the entire width of the display screen, or any other width which allows a convenient and comfortable placement of a user's hand in a writing position.

The elevation of the contoured hand rest surface according to the present invention is such that a user's hand may be placed comfortably thereon while allowing handwritten data to be comfortably and conveniently entered, and providing a stable and secure rest that not only supports the hand during writing, but also provides a barrier to the actuation of keys or buttons disposed adjacent to the contoured hand rest surface.

The length of the hand rest surface according to the present invention is such that adequate distance is given to allow comfortable, non-cramped handwriting on the touch screen, while at the same time maintaining the small size and portability the hand-held computer.

The hand rest surface of the computer according to the present invention may assume a variety of shapes. In one embodiment, the hand rest surface may be an incline plane extending upwardly and longitudinally between the touch screen and key pads.

In another embodiment of the present invention, the hand rest surface forms a curved ramp shaped surface with an upwardly curvilinear longitudinal cross-section and a substantially linear latitudinal cross-section and, with the edge of the contoured hand rest surface closest to the touch screen being substantially elevationally level with the touch screen with respect to the upper housing surface.

In another embodiment of the present invention, the hand rest surface forms a concave or cupped surface, wherein both the latitudinal and longitudinal cross-sections are substantially curvilinear.

Many of the hand rest surfaces according to the present invention may conveniently be described as portions of three-dimensional quadratic surfaces, which include, for example, spherical, ellipsoidal, circular or elliptic paraboloidal, circular or elliptic conical, circular or elliptic cylindrical, hyperboloidal, and hyperbolic paraboloidal quadratic surfaces.

The input screen may be of any suitable type, and preferably comprises conductive and resistive sheets responsive to operating pressures in the general range of normally applied writing pressures, and is covered with a suitable abrasion resistant cover, preferably of a suitable polymer. Although the touch screen surface preferably is disposed over a computer display screen, the present invention also pertains to a portable computer having a separate display and handwriting capture pad, such as a digitizing tablet or signature pad, and the like.

Disposed within the housing are a self-contained power source and a logic board which are electrically coupled, and which is suitably interconnected within the housing with the display screen, touch screen, input buttons or keys, etc., and also contains communication ports such as electrical contacts suitable for standard plug and receptacle connectors or cables, or an optical link, including optical cable or a link therefore, or wireless ports for infra red, ultrasonic, or radio frequency communication links, and the like. Such communication links are advantageously used for communication between the hand-held computer of the present invention and printing devices, pointing, locating, or drawing devices, another computer, such as another portable computer, desktop, workstation, or main frame computer, or computer network, optical scanner, optical reader, and the like.

According to a particular embodiment incorporating the features of the present invention, a computer housing may be structured of a base shell, having a base and peripherally raised walls, forming a base cavity for receiving the internal electrical components of the computer. An upper housing shell is mounted above the base cavity and sealingly engages with the base shell to protect the interior of the housing against entry of external contaminants such as liquids, dust, etc. The upper housing shell sealingly engages with the peripheral walls of the base shell, and may also have peripheral walls which extend the walls of the base cavity. The upper housing shell contains the hand rest contoured surface, preferably as an integrally molded portion thereof, though it may alternatively be rigidly and optionally removably or replaceably attached thereto. The base shell likewise is preferably contoured to provide a convenient and comfortable grip and located to provide stability and balance to the computer unit during entry of handwritten data.

According to another embodiment of the present invention, the computer preferably includes means for communication with external devices, for example, via a standard electrical connection and/or via an optical link, an infra red, ultrasonic, or radio frequency wireless link, or the like, or combinations thereof.

Referring to FIG. 1, there is shown a general pictorial view of a hand-held computer according to the present invention, designated generally by the reference numeral 10 which comprises an input screen or touch screen 12, keypad 14, and contoured hand rest 16. Also shown is a handle assembly 18, in exploded view, comprising a handle 20, which may be received in handle mounts 22, handle retaining screws 24, and stylus 26. In alternative embodiment (not shown) the stylus is stored on a snap assembly on a surface of computer 10.

The input screen 12 may be of any suitable type and is responsive to operating pressures in a suitable range normally applied by a user using a ball point pen, and is covered with a suitable abrasion resistant cover. The input screen 12 preferably has sufficiently high resolution to provide an accurate representation of handwritten data, including signatures.

The contoured hand rest 16 is shown as an integrally molded part of computer housing 12. In an alternative embodiment, the hand rest 16 may be separately molded or sculpted and rigidly attached to computer housing 12.

The embodiment in FIG. 1 shows a removable handle 30 which allows for replacement of handle 30 with future growth modules, and, in a preferred embodiment, may include one or more ports for electrically and/or communicatively coupling additional devices computer 10, such as a printer, input devices such as optical character set readers, etc. Preferably, handle 30 is sculpted or contoured for a comfortable hand grip.

Figure 2:
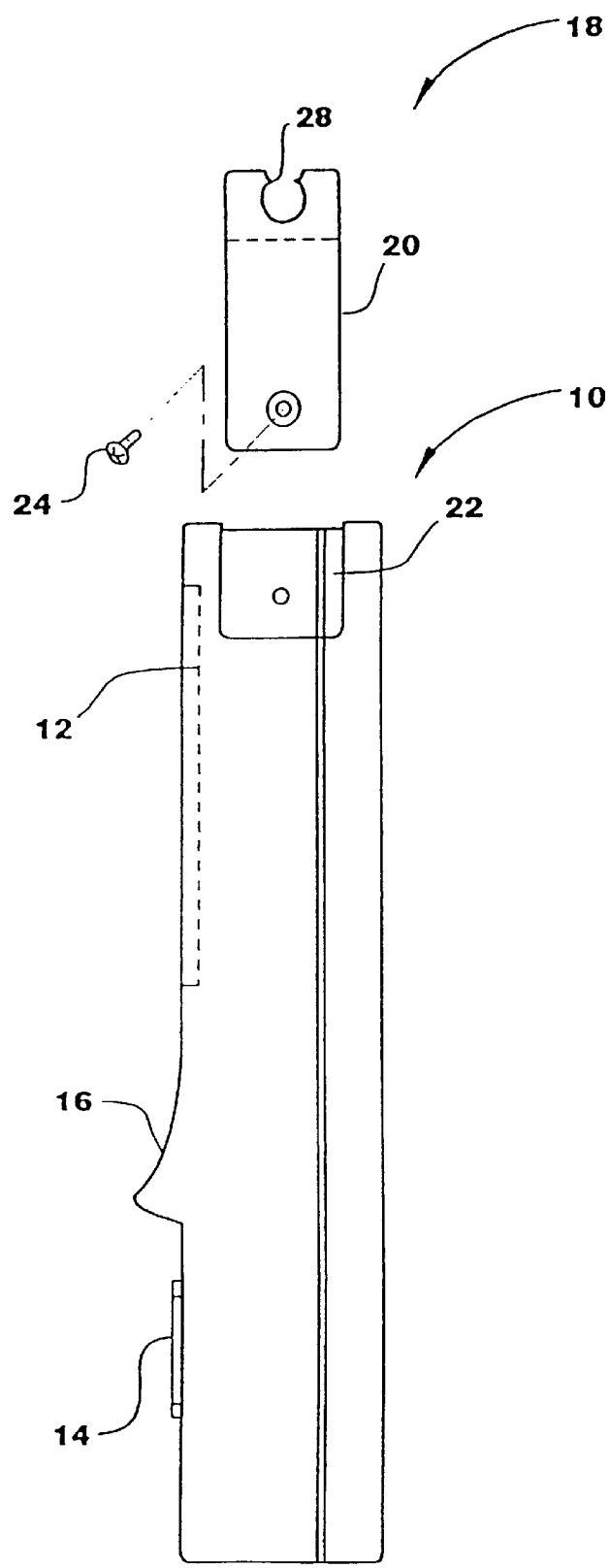
FIG. 2 is a side view of the computer shown in FIG. 1, clearly showing the longitudinal profile of an embodiment of the hand rest according to the present invention.

FIG. 2 shows a side view of the computer 10 shown in FIG. 1, which comprises touch screen 12, keypad 14, and contoured hand rest 16. Also shown is a handle assembly 18, in exploded view, comprising a handle 20, which may be received in handle mounts 22, handle retaining screws 24, and stylus retaining snap 28.

Figure 3:
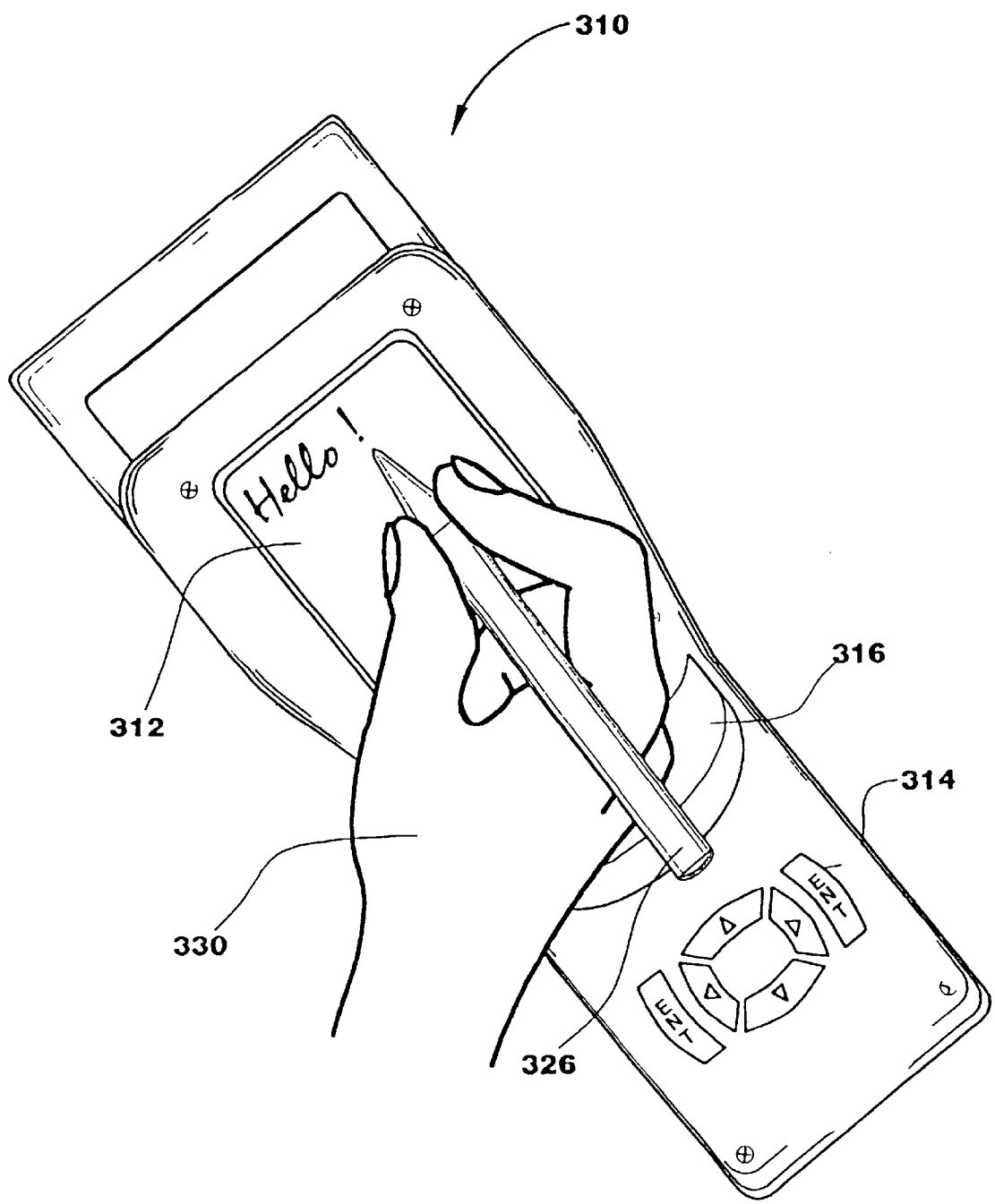
FIG. 3 shows pictorial representation of a particular embodiment of the present invention showing a user's hand position during entry of handwritten data.

FIG. 3 shows a pictorial view of another exemplary embodiment of the present invention wherein computer 310 comprises touch screen 312, keypad 314, and contoured hand rest 316, and shows a user's hand 330 holding stylus 326 in position for entry of handwritten data on touch screen 312.

Figure 4:
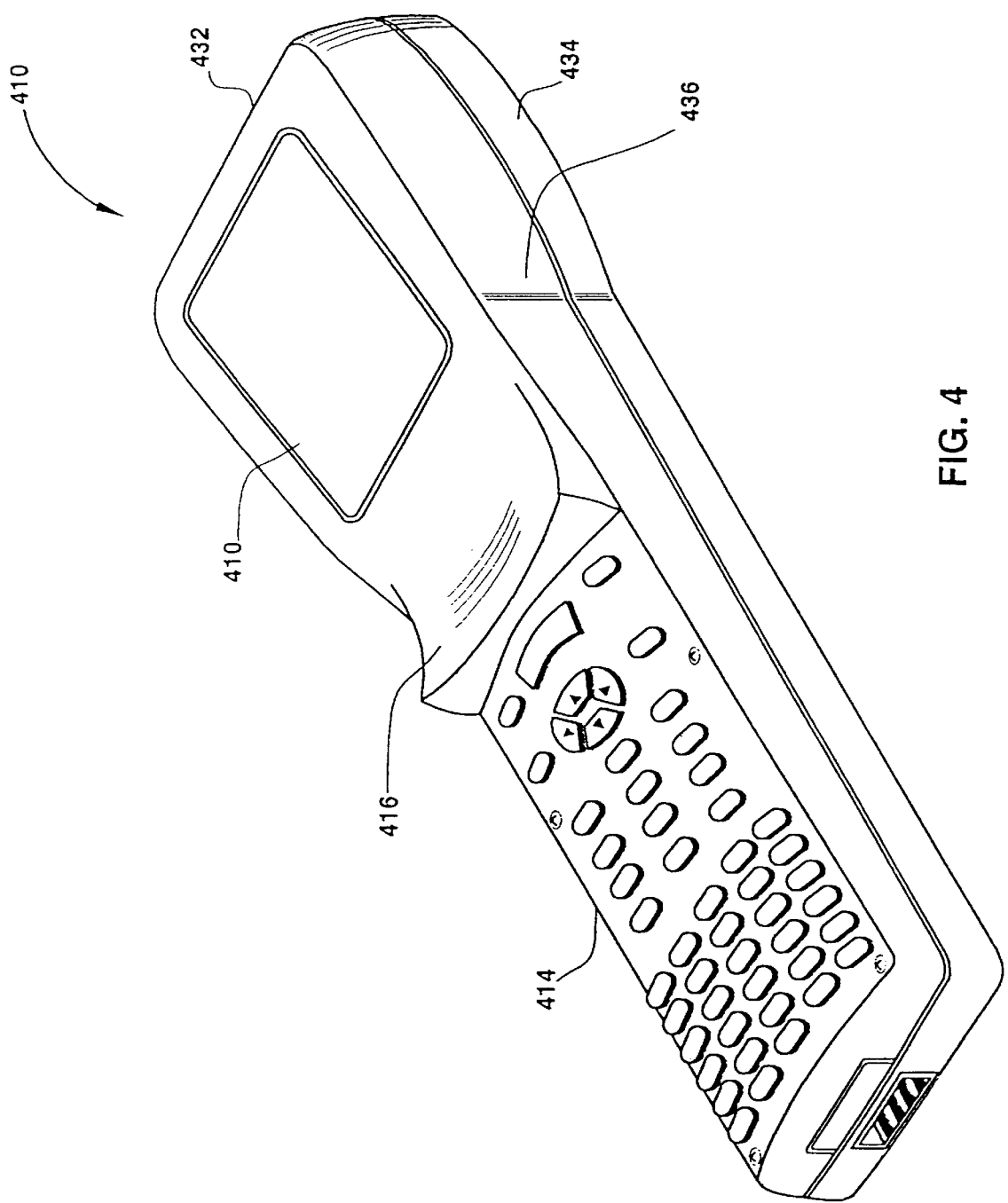
FIG. 4 is a general pictorial representation of another particular embodiment of the portable computer according to the present invention.

FIG. 4 shows a pictorial representation of another embodiment of the present invention, showing computer 410, comprising touch screen 412, and contoured hand rest 416, and having an extended keypad 414. A housing 432 of the computer 410 is of molded, high impact plastic type material and is made of a number of molded elements which are assembled into a unitary structure. The particular elements include base shell 434 which is interiorly sculpted with various mounting bosses and other molded protrusions (not shown) intended for attachment or location of elements of the computer 410. An upper computer housing shell 436 is sealingly attached to the base shell 434.

Figure 5:
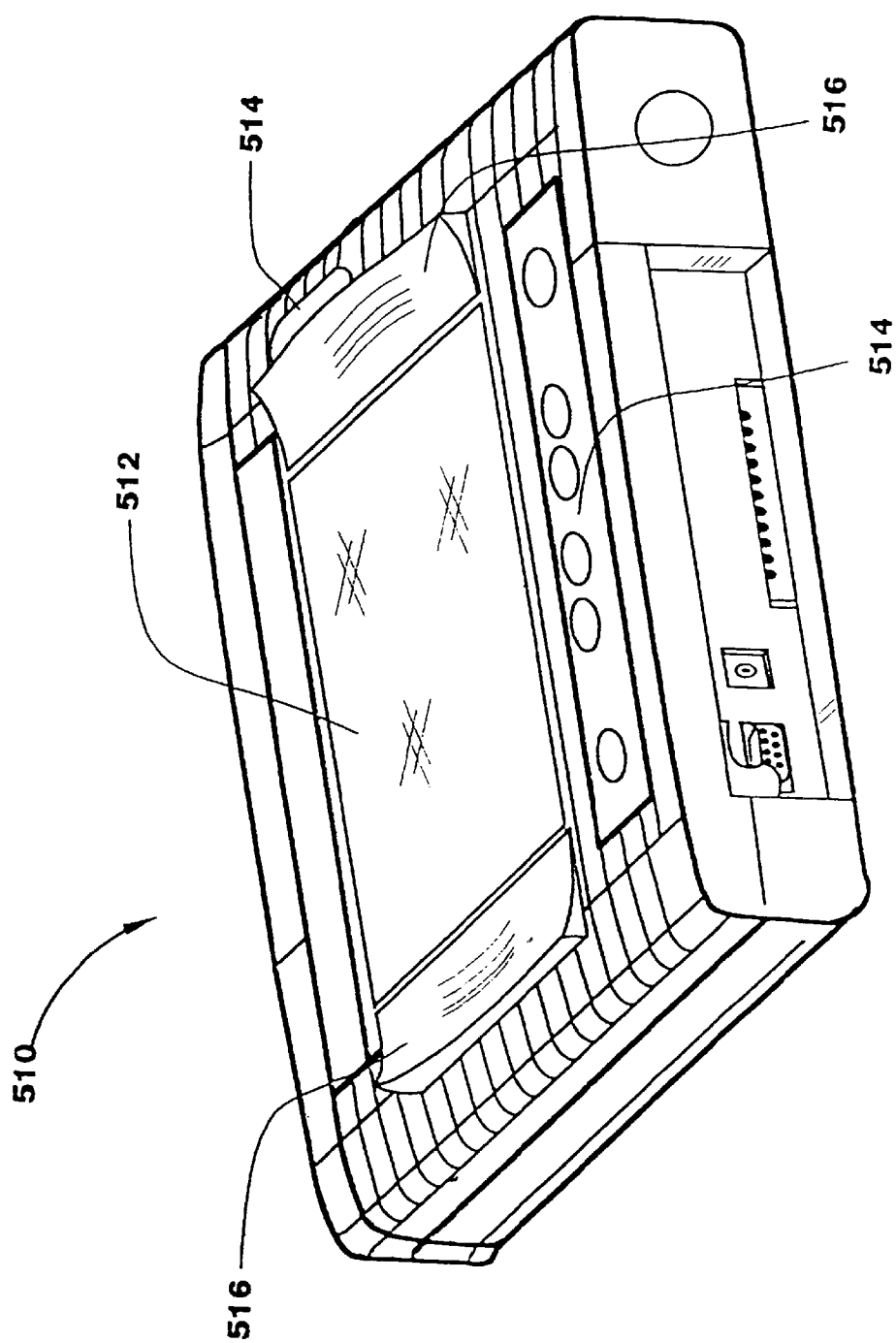
FIG. 5 is general pictorial representation of yet another embodiment of the hand-held computer according to the present invention.

FIG. 5 shows a general pictorial representation of another embodiment of the present invention, showing a portable computer 510, which includes touch screen 512, keypad areas 514, and contoured hand rest surface 516.

Figure 6A:
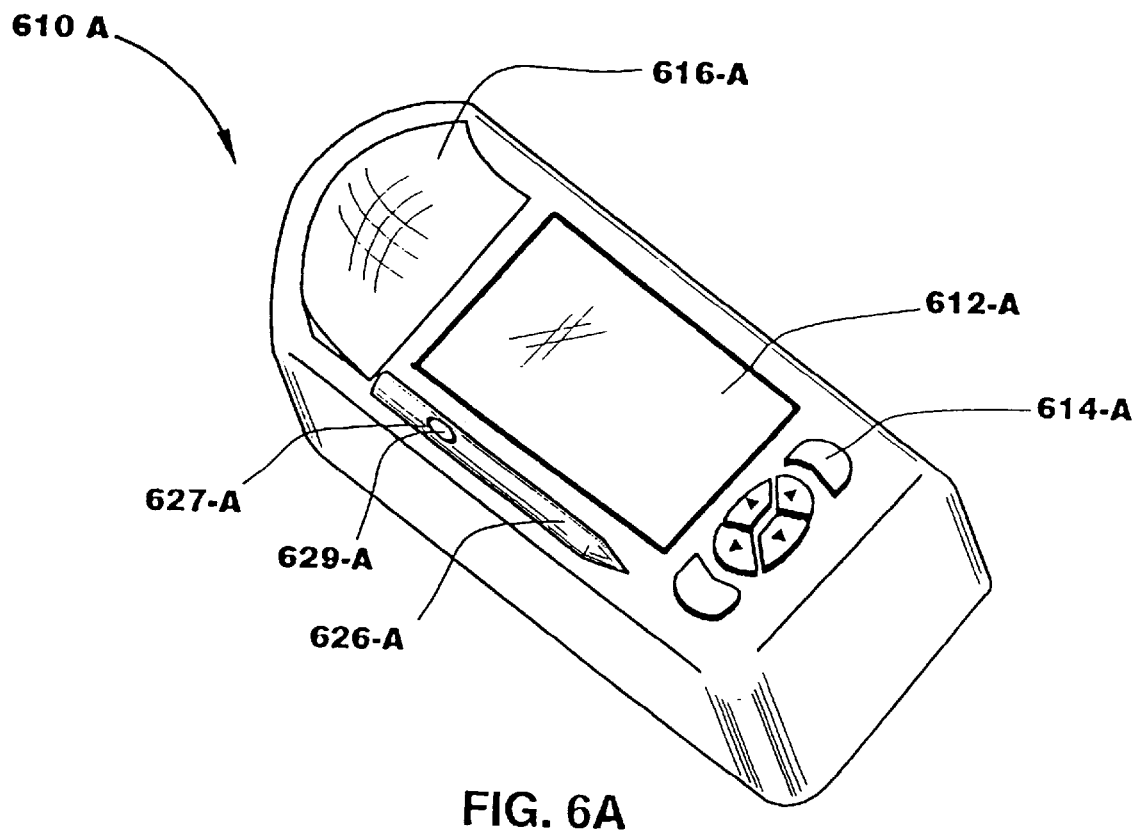
FIG. 6A is a general pictorial representation of still another embodiment of the portable computer according to the present invention.

FIG. 6A shows a general pictorial representation of computer 610-A according to the present invention having a touch screen 612-A, keypad area 614A, and having contoured hand rest area 616-A disposed adjacent to touch screen 612-A and disposed away from keypad area 614-A. Stylus 626-A is shown mounted on the upper surface of computer 610-A via an integrally molded peg 629A fitted to a hole 627-A in stylus 626-A. Alternatively, stylus 626-A may be secured to the surface of computer 610-A via a snap assembly (not shown, see FIG. 2, reference numeral 28).

Figure 6B:
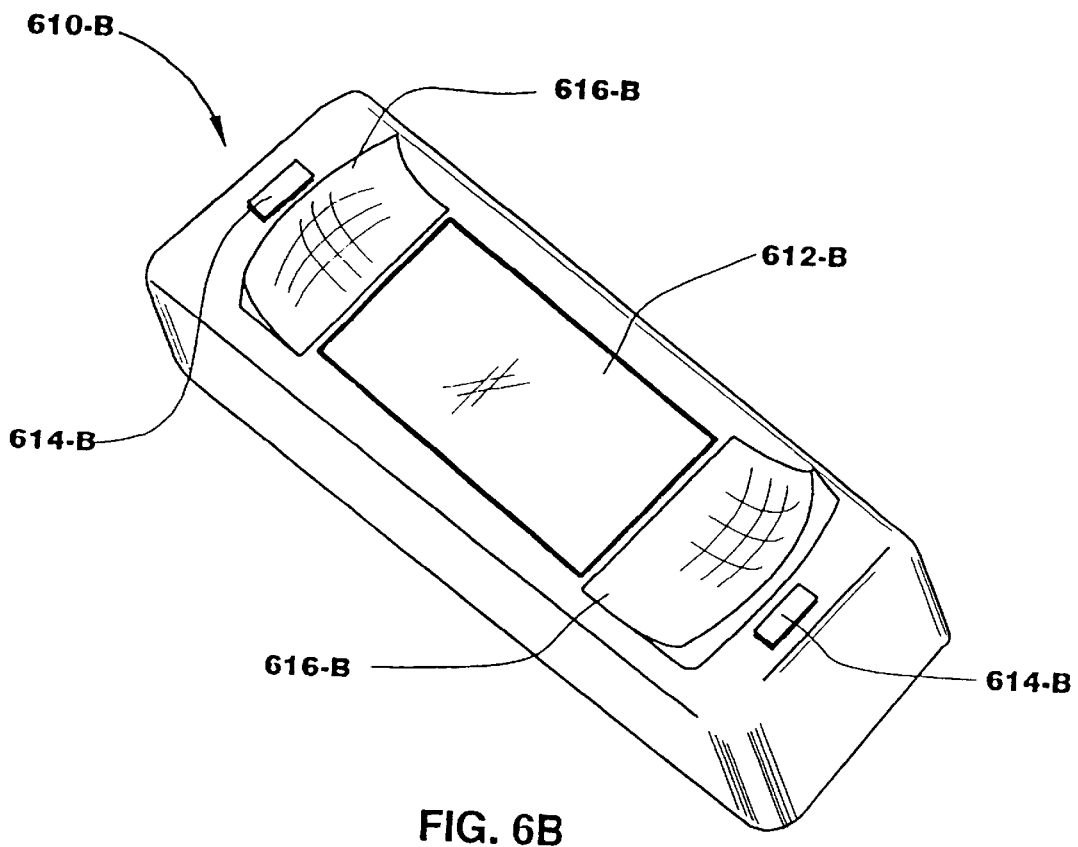
FIG. 6B is a general pictorial representation of another embodiment of the portable computer according to the present invention having a plurality of contoured hand rest surfaces.

FIG. 6B shows a general pictorial representation of computer 610-B according to the present invention having a touch screen 612-B, a plurality of keypad areas 614-B, and having a plurality of contoured hand rest areas 616-B disposed adjacent to touch screen 612-B, allowing convenient entry of handwritten data by left- and right-handed users.

Figure 6C:
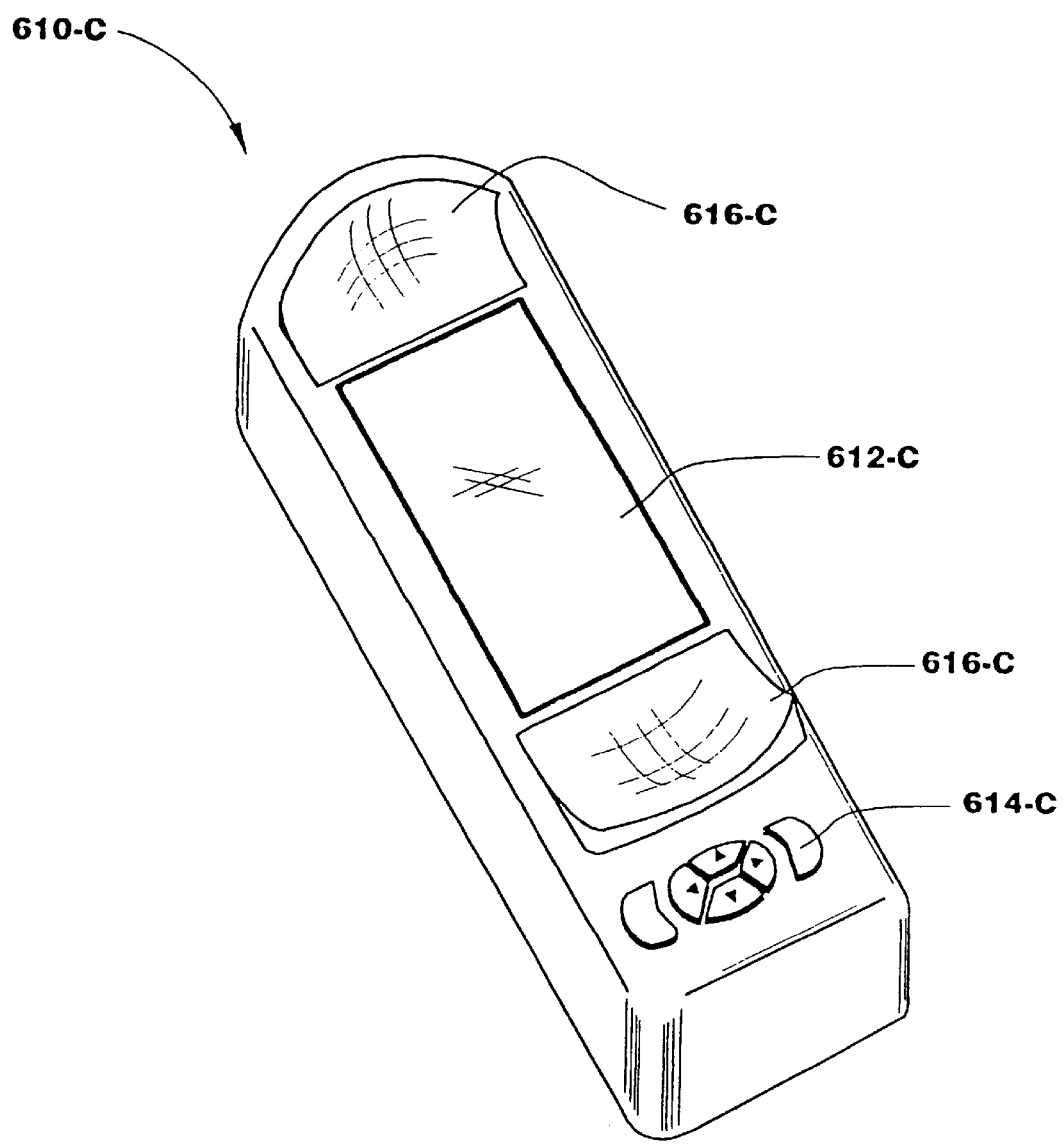
FIG. 6C is a general pictorial representation of another embodiment of the present invention employing a plurality of hand rest surfaces.
Figure 7A:
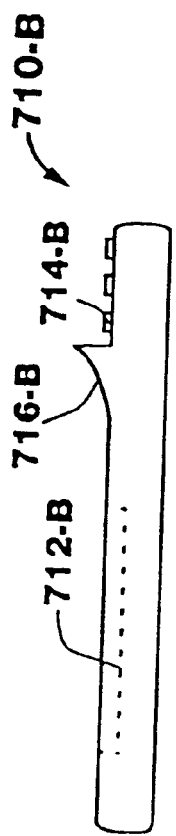
FIGS. 7A through 7J show longitudinal profiles of several particular embodiments of the hand rest surface according to the present invention.
Figure 7B:
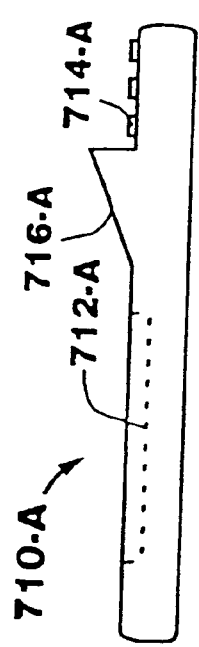
Figure 7C:
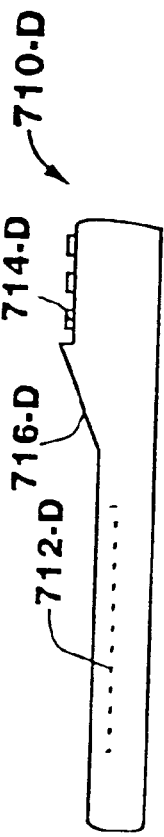
Figure 7D:
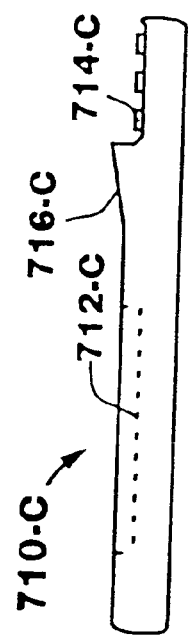
Figure 7E:
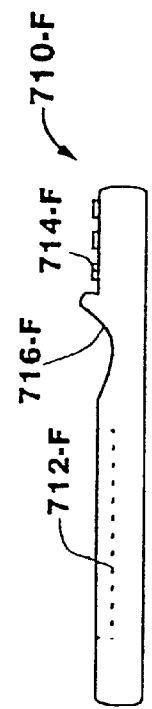
Figure 7F:
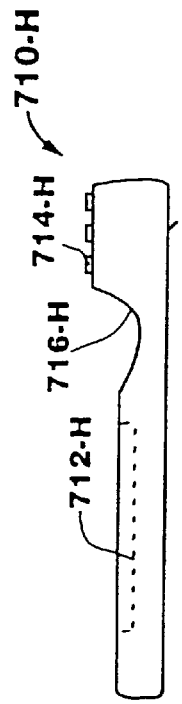
Figure 7H:
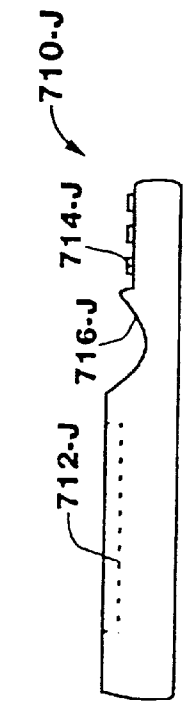
Figure 7G:
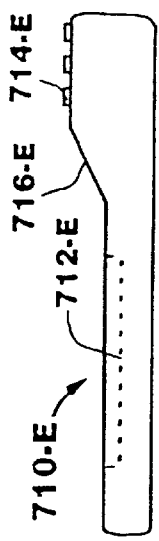
Figure 7I:
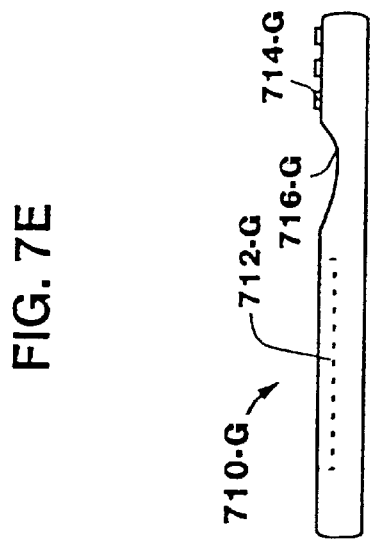
Figure 7J:
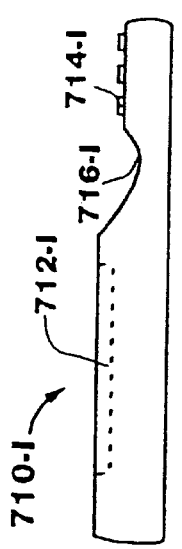

FIG. 6C shows a general pictorial representation of computer 610-C according to yet another embodiment of the present invention having a touch screen 612-C, keypad area 614-B, and having a plurality of contoured hand rest areas 616B disposed adjacent to touch screen 612-B, allowing convenient entry of handwritten data by left- and right-handed users.

FIGS. 7A through 7J show the longitudinal profiles of various embodiments of the present invention, and show hand-held computers 710-A through 710-J according to the present invention, contoured hand rests 716-A through 716-J a variety of shapes configurations in relation to touch screens 712-A through 712-J and keypads 714-A through 714-J.

Figure 8:
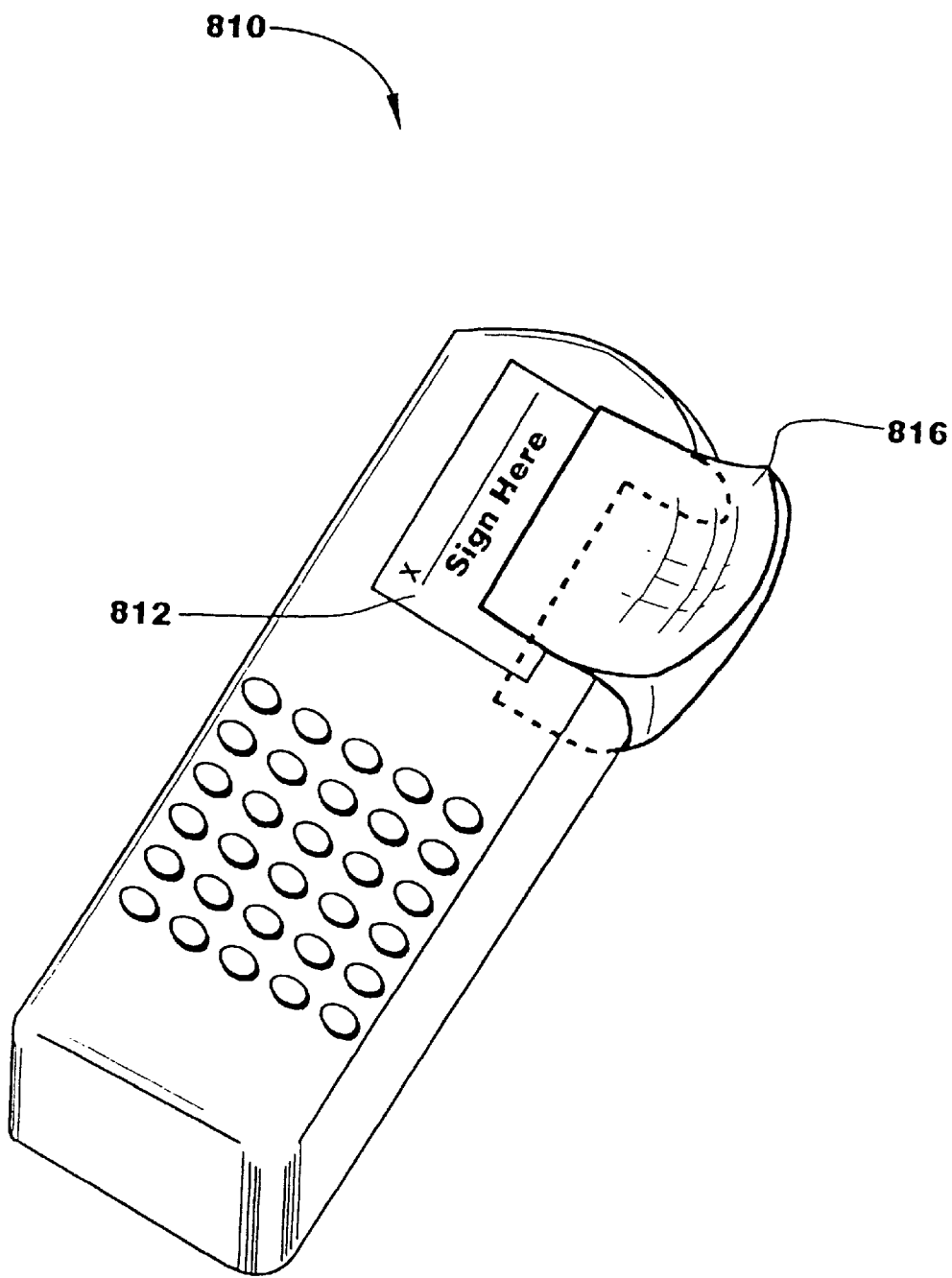
FIG. 8 shows a pictorial view of a portable computer according to the present invention wherein the hand rest area is removable and may be attached from the top or either side.

FIG. 8 shows a pictorial view of computer 810 having a detachable hand rest surface 816 covering a portion of input screen 812 mounted thereon. Hand rest 816 is shown mounted on the right side of the computer, but may advantageously be rotated in 900 increments around three sides of the input screen 812 in conjunction with a display rotation software feature.

Figure 9:
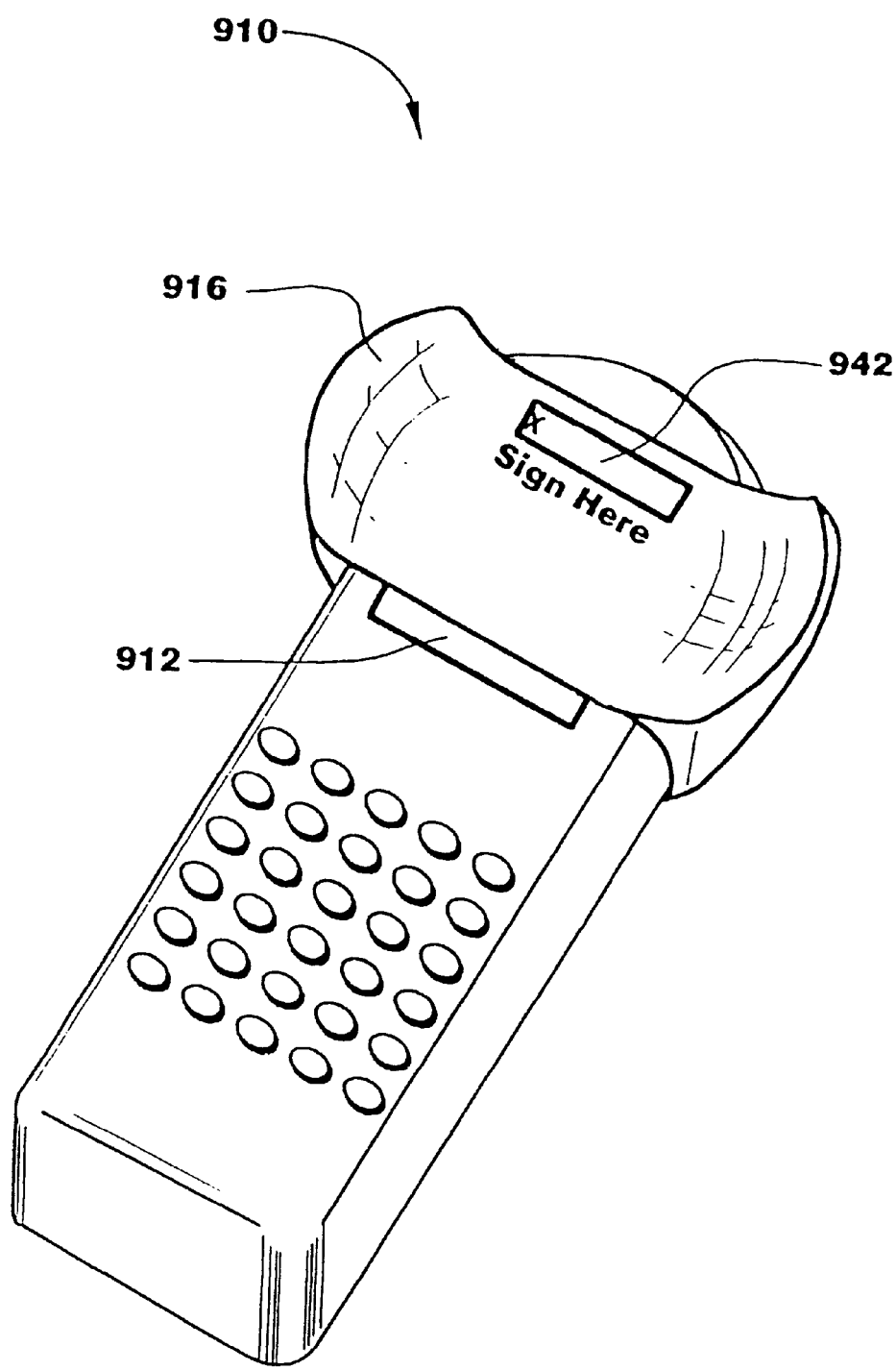
FIG. 9 shows a pictorial view of a hand-held computer according to the present invention wherein a hand rest surface adapted for left- and right-handed use area covers the touch screen except for a signature area.

FIG. 9 shows a pictorial view of computer 910 having a detachable hand rest 916 with ported opening 942 allowing access to a signature area of input screen 912.

Figure 10:
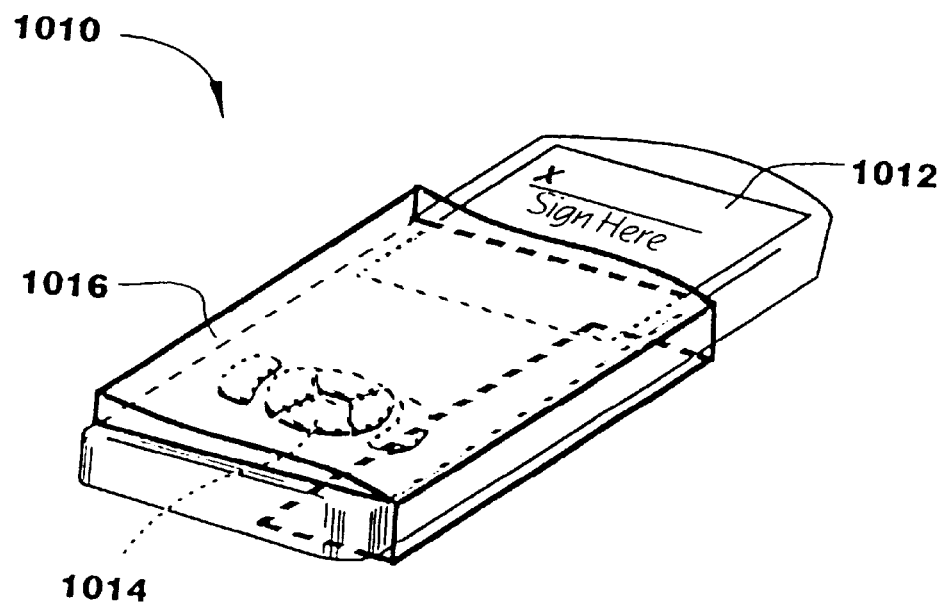
FIG. 10 illustrates an embodiment according to the present invention wherein the hand rest physically covers the buttons and a portion of the touch screen

FIG. 10 shows a pictorial view of computer 1010 having removable hand rest 1016 covering key pad area 1014 and a portion of input screen 1012. In the embodiment shown herein, the hand rest 1016 may be rotated 1800 to accommodate both left and right handed users. The embodiments according to FIGS. 8–10 also have space saving advantages in that a portion of the area occupied by the input screen is also used for the hand rest without risk of inadvertently activating other portions of the input screen.

2. Hand-Held Computer Having a Button or Sensor to Deactivate Keys.

A second means for preventing unintentional actuation of keys comprises a button or sensor that deactivates some or all of the keys on the computer housing. The button may be located on the surface of the computer housing to toggle a "handwriting mode" on, wherein some or all of the buttons or keys on the surface of the computer are deactivated, and off, wherein keyed input may be entered.

Depending on the keyboard or key pad configuration, it may be desirable to deactivate only some of the keys. For example, it may be desirable to deactivate only those keys nearest the touch screen, while leaving those keys that are out of reach enabled. Also, it may be desirable to allow two-handed commands, such as such as point and click, wherein buttons sending the mouse click are allowed to remain active. Advantageously, when the means for deactivating the keys is itself a button on the surface of the computer, it is advantageous to allow it to remain active when the handwriting mode is on to allow it to switch the handwriting mode off when key pad input is desired.

Alternatively, the handwriting mode may be turned on and off via a button or sensor located beneath the hand rest area. In this embodiment, the hand rest surface activates a switch when the pressure of a and is applied, and is preferably responsive to a range of pressures normally applied during the handwriting entry process. The switch may be activated, for example, by a depressable hand rest area whereby the pressure of the hand overcomes the force of a compressible, deformable, or resilient material, such as a spring, foam, gel, plastic, rubber, and the like. The switch may comprise one or more conventional keyboard or key pad switches, and or both of the conductors of the switch may be a conductive sheet thus enabling activation of the handwriting mode over a broad range of hand sized and hand placements during entry of handwritten data.

In a preferred embodiment, the switch may be deactivated at the user's option via hardware or software configuration if the handwriting mode capability is not desired.

It may be desirable to deactivate peripheral devices, such as printers, optical readers, wireless ports, etc., instead of, or in addition to, deactivating the buttons. This would prevent, for example, the inadvertent sending of a print command, and also is an important safety feature when laser emitting devices such as scanners, bar code readers, and the like are attached and which may be directed toward a person's eyes when being used for entry of handwritten data.

Figure 11:
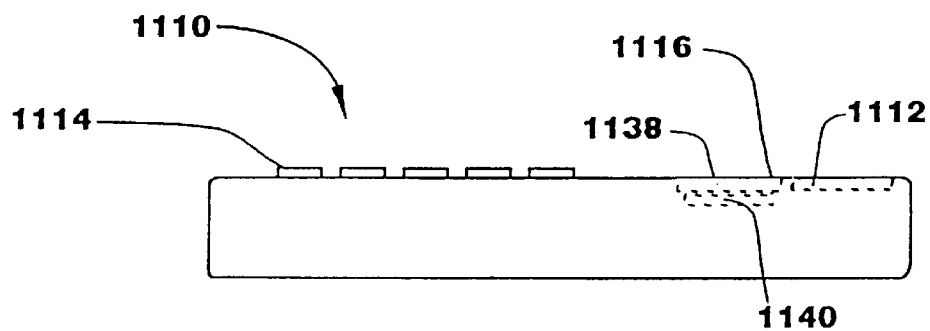
FIG. 11 shows a diagrammatic representation of the hand-held computer employing a key pad deactivating switch located beneath a depressable hand rest area.
Figure 12:
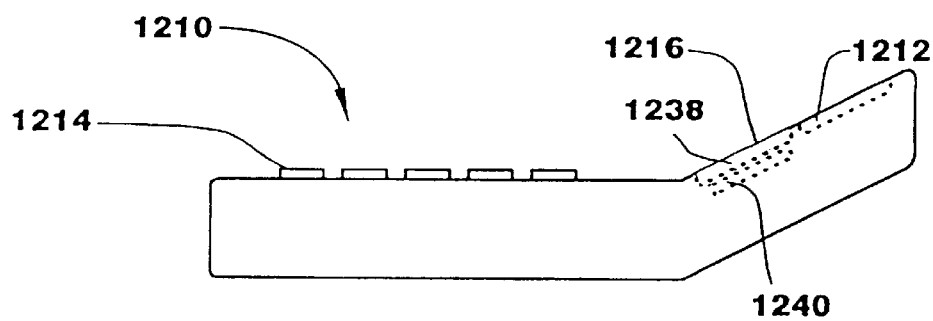
FIG. 12 shows a computer similar to that shown in FIG. 11 wherein the input screen is tilted.

FIG. 11 shows a diagrammatic view of a hand-held computer terminal 1110 having input screen 1112, key pad area 1114, and hand rest area 1116. Directly beneath hand rest area 1116 is a compressible material 1138 which is located over switch 1140 which is activated via pressure on hand rest area 1116. Computer 1110 is shown with substantially level input screen 1112, hand rest 1116, and key pad area 1114. FIG. 12 shows an alternative embodiment having input screen 1212, key pad area 1214, and hand rest area 1216. Directly beneath hand rest area 1216 is a compressible material 1238 which is located over switch 1240 which is activated via pressure on hand rest area 1216 wherein input screen 1212 is tilted for ease of handwritten input. Examples of compressible materials include, for example resilient materials such as gels, foams, plastics, rubber, and the like, or may comprise a mechanical structure such as a spring. The compressible material may directly contact the user's hand during the hand written data entry process, or may further comprise a moveable, i.e., downwardly displaceable, plate mounted thereon. In an alternative embodiment (not shown), the compressible material may be replaced with an externally mounted sensor such as a thermal sensor.

3. Sensing input screen activity to prevent unintended actuation of keys during entry of handwritten data.

A third means for preventing unintended actuation of keys during entry of handwritten data comprises sensing whether the touch screen is active. When the input screen is active, a "handwriting" mode is turned on whereby some or all of the keys on the computer housing are deactivated. The handwriting mode may be entered as soon as the stylus is sensed by the touch screen. Alternatively, motion of the stylus before the handwriting mode is entered, thereby allowing pointing with the stylus without deactivating the buttons.

Again, depending on the keyboard or key pad configuration, it may be desirable to deactivate only some of the keys. For example, it may be desirable to deactivate only those keys nearest the touch screen, while leaving those keys that are out of reach enabled. Also, it may be desirable to allow two-handed commands, such as such as point and click, wherein buttons sending the mouse click are allowed to remain active, particularly when the computer is programmed to employ the handwriting mode as soon as the stylus is sensed, i.e., without motion of the sensor.

In a preferred embodiment, the user may select via hardware or software configuration whether the handwriting mode is entered upon sensing the stylus, sensing motion, or disabled.

Figure 13:
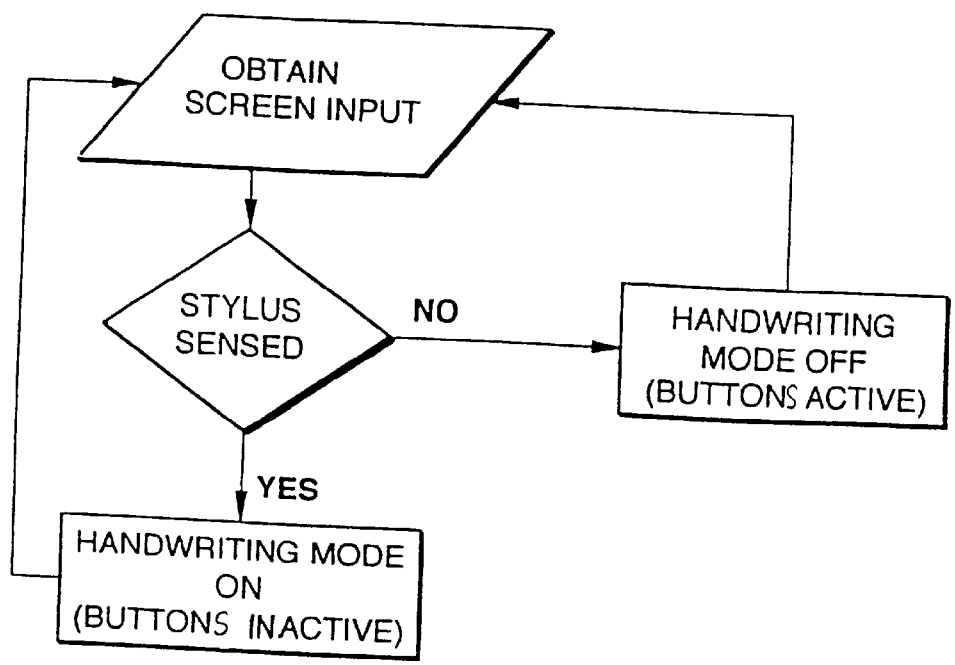
FIG. 13 shows a flow chart of a method according to the present invention for sensing touch screen activity to prevent inadvertent actuation of keys during entry of handwritten data.
Figure 14:
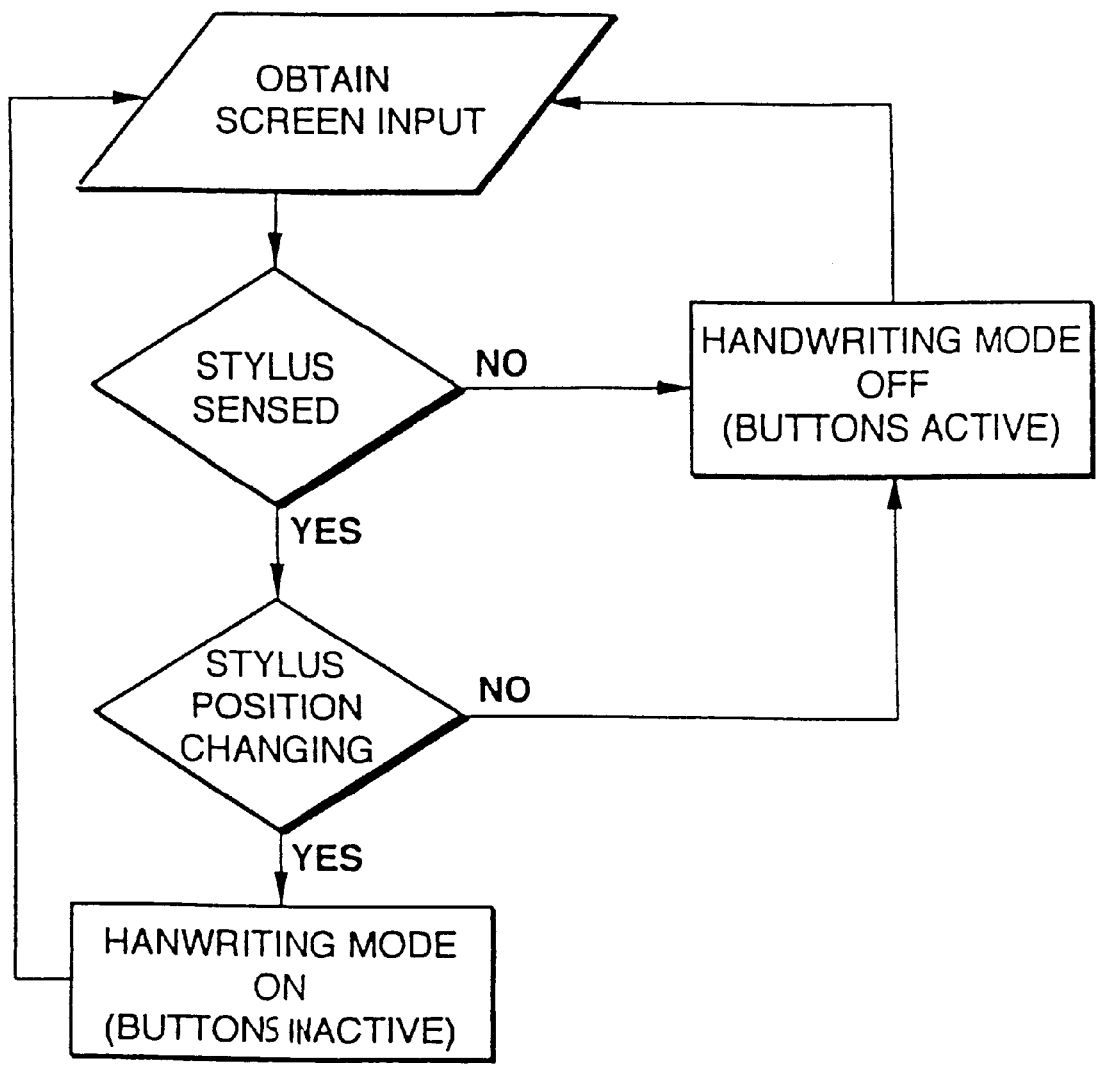
FIG. 14 shows a flow chart of an alternative embodiment of a method according to the present invention for sensing touch screen activity to prevent inadvertent actuation of keys during entry of handwritten data.

FIG. 13 shows a flow chart of the method of preventing unintended actuation of the keys according to the present invention wherein the handwriting mode is turned on when the stylus is sensed by the input screen and turned off when the stylus is no longer sensed. FIG. 14 is a flow chart of the method of preventing unintended actuation of the keys according to the present invention wherein the handwriting mode is not entered unless stylus motion is sensed by the touch screen. This embodiment allows a user to use the stylus to point (stylus position not changing) without disabling some or all of the key pad buttons.

As detailed above, it may also be desirable to deactivate peripheral devices, such as printers, optical readers, wireless ports, etc., instead of, or in addition to, deactivating the keys and buttons in order to prevent inadvertent actuation of te peripheral devices.

The description above should not be construed as limiting the scope of the invention, but as merely providing illustrations to some of the presently preferred embodiments of this invention. In light of the above description, various other modifications and variations will now become apparent to those skilled in the art without departing from the spirit and scope of the present invention as defined by the appended claims. Accordingly, scope of the invention should be determined solely by the appended claims and their legal equivalents.

What is claimed is:

1. A portable computer comprising a housing, a data processor, handwritten data capture means disposed on said housing and operatively and communicatively coupled to said data processor, one or more input keys disposed on said housing, and a hand rest on said housing, said hand rest comprising a means for sensing a user's hand and for deactivating one or more of said input keys in response to sensing a user's hand.

2. A portable computer comprising a housing a data processor and data storage means, handwritten data capture means disposed on said housing and operatively and communicatively coupled to said data processor one or more input keys disposed on said housing and a hand rest on said housing, said hand rest comprising a means for sensing a user's hand, wherein said means for sensing a user's hand comprises a switch for deactivating some or all of said input keys.

3. The portable computer according to claim 2, wherein said switch is disposed beneath or within a depressable area of said hand rest.

4. A portable computer comprising a housing, a data processor system and a data storage system, a handwritten data capture system disposed on said housing and operatively and communicatively coupled to said data processor system, one or more keys disposed on said housing, and a hand rest on said housing, said hand rest comprising a sensor system for sensing a user's hand, and for deactivating one or more of said keys in response to the sensing of a user's hand.

5. The portable computer according to claim 4 wherein said sensor system comprises a switch disposed beneath or within a depressable area of said hand rest.

* * * * *